United States Patent [19]

McCarty et al.

[11] 4,456,425

[45] Jun. 26, 1984

[54] MODULAR INLET GEARBOX FOR A GAS TURBINE ENGINE

[75] Inventors: William V. McCarty; Donald J. Thiemann, both of Cincinnati, Ohio

[73] Assignee: General Electric Company, Cincinnati, Ohio

[21] Appl. No.: 208,893

[22] Filed: Nov. 20, 1980

[51] Int. Cl.³ ........................ F01D 15/12; F16D 1/10
[52] U.S. Cl. ........................... 415/122 R; 416/170 R; 74/416; 403/359
[58] Field of Search ................. 415/60, 62, 68, 122 R; 416/170 R, 160; 403/359, 254; 74/416, 417

[56] References Cited

U.S. PATENT DOCUMENTS

| 2,089,168 | 8/1937 | Brown | 403/359 X |
| 2,397,905 | 4/1946 | Acton et al. | 403/359 X |
| 2,611,632 | 9/1952 | Harris | 403/359 X |
| 2,738,125 | 3/1956 | Ledwith | 403/359 X |
| 2,967,069 | 1/1961 | Holmes | |
| 3,226,987 | 1/1966 | McCarty | 74/15.63 |
| 3,393,533 | 7/1968 | Wilkinson | 403/359 X |
| 3,602,535 | 8/1971 | Behning | 403/359 X |
| 3,622,185 | 11/1971 | Rosan et al. | 403/359 X |
| 3,902,822 | 9/1975 | Andrews et al. | 416/170 |
| 3,970,398 | 7/1976 | Wilson | 403/359 X |
| 4,344,305 | 8/1982 | Holmes | 403/359 |

FOREIGN PATENT DOCUMENTS

| 1181043 | 6/1959 | France | 415/122 |
| 802263 | 10/1958 | United Kingdom | 403/359 |
| 1190165 | 4/1970 | United Kingdom | 403/359 |

Primary Examiner—Philip R. Coe
Assistant Examiner—Frankie L. Stinson
Attorney, Agent, or Firm—Stephen S. Strunck; Derek P. Lawrence

[57] ABSTRACT

In one embodiment, the inlet gearbox includes a gearbox housing which is removably coupled to a fan module. The gearbox includes a horizontal gear for removably mating with gear teeth on the stub shaft of the compressor module. The gearbox includes vertical gear means coupled to the horizontal gear means for developing a drive output of the gearbox. A single main shaft bearing is fixedly disposed in the gearbox housing. The main shaft bearing supportably receives a rearward extension of the horizontal gear. The stub shaft is inserted into the rearward extension of the horizontal gear. The main shaft bearing provides the sole rotational support for the horizontal gear of the modular inlet gearbox and for the forward end of the stub shaft of the compressor module. The main shaft bearing is disposed in the inlet gearbox housing in a controlled environment prior to assembly of the inlet gearbox into the gas turbine engine. A coupling nut, including two internal locknuts, is provided for removably coupling the gearbox to the compressor stub shaft.

6 Claims, 3 Drawing Figures

MODULAR INLET GEARBOX FOR A GAS TURBINE ENGINE

BACKGROUND OF THE INVENTION

The present invention relates to a modular inlet gearbox for a gas turbine engine, and more particularly, to such a gearbox which provides improved assembly and disassembly of a gas turbine engine.

A typical gas turbine engine may include: a fan section; a compressor section; a combustor section; a high pressure turbine section; a low pressure turbine section; and an exhaust section. In the operation of such a typical gas turbine engine, controlled ignition in the combustor section is utilized to drive the high pressure turbine, low pressure turbine and fan sections in a regenerative manner. Such engines require a number of controls and accessories, including such devices as fuel pumps and fuel controls. These controls and accessories are powered through a gearing relationship to the engine. In this connection, an inlet gearbox is provided for tapping a portion of the rotational energy of the compressor and developing an inlet gearbox output. The inlet gearbox includes a horizontal gear portion, typically referred to as a horizontal bevel gear, for tapping the rotational energy of the compressor and a vertical gear portion for providing the output drive energy of the inlet gearbox. The output of the inlet gearbox is utilized to drive other control accessory gearboxes and ultimately to drive particular controls and accessories. One exemplary inlet gearbox is described in U.S. Pat. No. 3,226,987, entitled "Gear Assembly," issued Jan. 4, 1976, to W. V. McCarty.

In one form of inlet gearbox, the inlet gearbox is constructed in a controlled environment, e.g., a gearbox room, where it is also provided with an inlet gearbox horizontal bearing. The inlet gearbox, including the gearbox horizontal bearing, is then assembled as part of the gas turbine engine. In this connection, the front end of the compressor section, often referred to as the compressor stub shaft, is also provided with a rotational bearing. When such an inlet gearbox is assembled into the engine, there thus results two horizontal bearings at the gearbox-stub shaft interface. These bearings must be carefully aligned for successful engine operation. The two-bearing structure generally requires a flexible drive, e.g., spline, connection between the inlet gearbox and the front end of the compressor. It has been found that these bearings, and the flexible drive spline, often exhibit undesirable wear characteristics due to misalignment which tend to reduce engine part life.

In another form of inlet gearbox, an attempt is made to simplify the inlet gearbox by combining the functions of the previously mentioned bearings into a single bearing. In this form, the horizontal bevel gear is assembled onto the front end of the compressor section. This inlet gearbox requires substantial assembly time and effort to obtain correct bevel gear axial locations, thereby lengthening the overall assembly time of the engine.

The previously noted forms of inlet gearboxes exhibit certain undesirable characteristics. In this connection, manufacturing tolerances are such that during assembly of the engine, the inlet gearbox and associated horizontal bearing may require considerable machining and/or adjustment. Also, disassembly of conventional inlet gearboxes and the engine is often difficult and time-consuming to accomplish. In addition, the use of two horizontal bearings creates a cost and weight penalty as compared to a single horizontal bearing for rotatably supporting both the inlet gearbox and the front end of the compressor section.

OBJECTS OF THE INVENTION

Accordingly, it is a general object of the present invention to provide improved inlet gearbox means.

It is another object of the present invention to provide such an inlet gearbox having a main horizontal bearing fixedly coupled thereto for supporting both the horizontal gear means and the front end of the compressor section.

It is another object of the present invention to provide such an inlet gearbox which can be constructed in a controlled environment.

It is another object of the present invention to provide such an inlet gearbox which provides simple assembly and disassembly of the gearbox/engine.

SUMMARY OF THE INVENTION

In one form of the invention, we provide a modular inlet gearbox for use in a gas turbine engine having a fan section and a compressor section. The inlet gearbox is disposed between the fan section and a forward end of the compressor section. The inlet gearbox includes a gearbox housing adapted to be removably coupled to a portion of the fan section. The housing includes gearbox horizontal gear means for removably mating with compressor horizontal gear means on the forward end of the compressor section. Gearbox vertical gear means is coupled to the gearbox horizontal gear means for developing a drive output of the gearbox. Main shaft bearing means is fixedly disposed in the housing for removably receiving a rearward portion of the gearbox horizontal gear means and the forward end of the compressor section. The main shaft bearing means provides the sole support for the inlet gearbox horizontal gear means and the forward end of the compressor section. The main shaft bearing means is disposed in the gearbox housing prior to assembly of the inlet gearbox into the gas turbine engine.

BRIEF DESCRIPTION OF THE DRAWINGS

For a better understanding of the invention, reference may be had to the following description, taken in conjunction with the accompanying drawings, wherein.

DETAILED DESCRIPTION OF THE INVENTION

Figure 1:
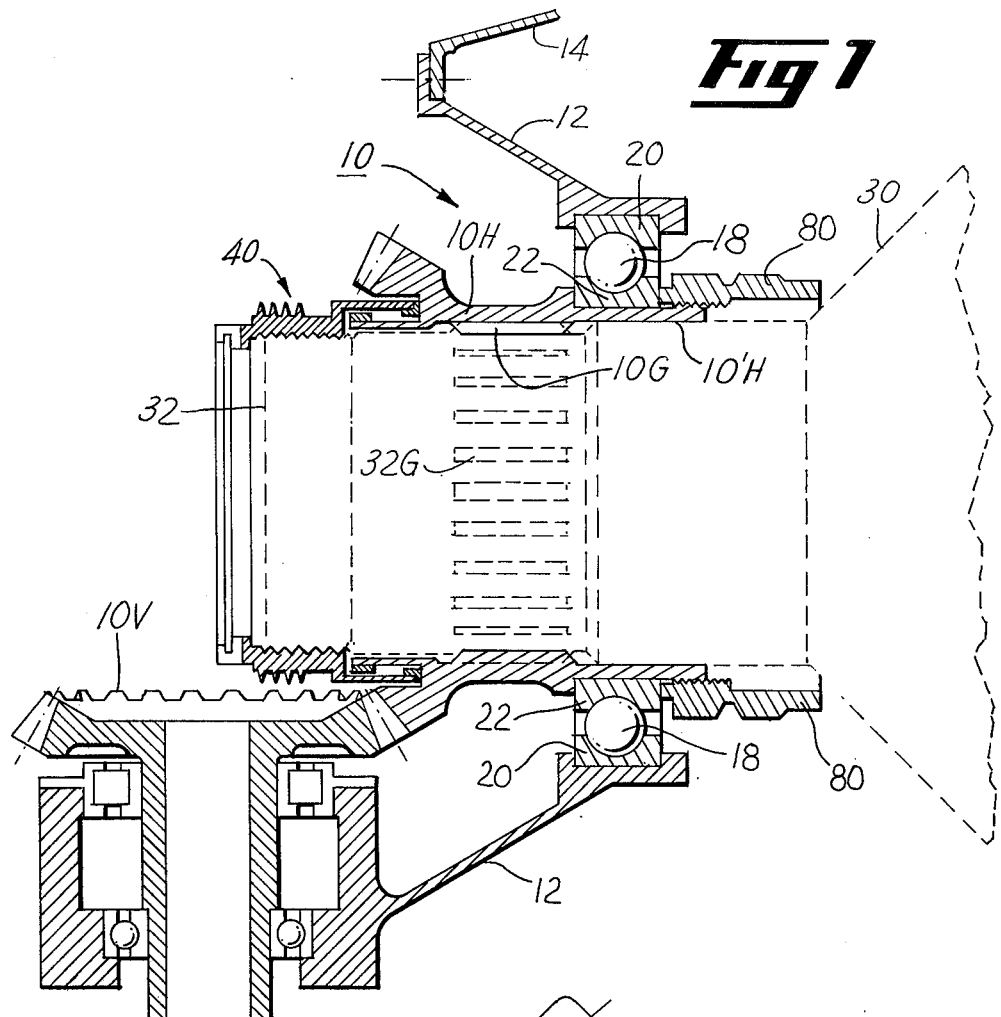
FIG. 1 is a sectional assembly view of one form of modular inlet gearbox of the present invention in combination with a forward end of a compressor section.

Referring initially to FIG. 1, one form of inlet gearbox of the present invention is generally designated 10. The inlet gearbox 10 is shown in combination with a compressor section 30 (partially shown in phantom). The inlet gearbox 10 includes a housing 12 which is removably coupled to a portion of the fan section at fan frame portion 14. The inlet gearbox 10 includes a horizontal gear means 10H, supported by the housing 12, for mating with the forward end 32, i.e., stub shaft, of the compressor section 30. The inlet gearbox 10 also includes a conventional vertical gear means 10V which is coupled to the horizontal gearbox means 10H for developing the drive output 24 of the gearbox 10.

A main shaft bearing 18 is fixedly disposed in the housing 12 such that the outer race 20 of bearing 18 is mounted in the housing 12. The inner race 22 of the bearing 18 is positioned to supportably receive a rearward extension 10'H of the horizontal gear means 10H. Extension 10'H has external threads at the rearward most part thereof over which annular retainer member 80, having internal threads, is screwed to effect the mating of inner race 22 to horizontal gear means 10H. The stub shaft 32 of the compressor section 30 is inserted into the horizontal gear means 10H such that the bearing 18 provides the sole rotational bearing support for the horizontal gear means 10H of the gearbox 10 and the stub shaft 32. For rotationally mating the horizontal gear means 10H with the stub shaft 32 of the compressor 30, the gear means 10H is provided with fixed spline gear teeth 10G. The stub shaft 32 is also provided with mating gear teeth 32G.

Coupling means, generally designated 40, is provided for removably mating the horizontal gear means 10H with the stub shaft 32. The coupling means 40 is most clearly illustrated in FIGS. 2 and 3.

The coupling means 40 includes a coupling nut 42 having a forward portion 42A. The forward portion 42A is internally threaded for engaging a matingly threaded portion 32S of the stub shaft 32. The coupling nut 42 includes a rear portion 42B which is internally threaded, reversely related to the threaded first portion 42A. The coupling nut 42 also includes at least two radial openings 43 for receiving a tool therethrough. The coupling nut 42 includes therein locknuts 44 and 46 which provide the desirable assembly/disassembly feature of the present invention. Locknut 44 also includes at least two radial openings 45 for receiving a tool therethrough. After the gearbox 10 has been constructed in a controlled environment, e.g., a gearbox room, the coupling nut 42 is loosely mounted through locknuts 44 and 46 to the horizontal gear means 10H. In making this connection, in the gear room, intermediate locknut 44 is inserted loosely into coupling nut 42. The rear locknut 46, threaded similarly to portion 42B and including shoulder portion 46S, is then threaded into the internally threaded rear portion 42B of the coupling nut 42.

The three-nut assembly, i.e., coupling nut 42, intermediate locknut 44, and rear locknut 46, is then threaded onto the horizontal gear 10H. In a preferred operation, a conventional tool (not shown) is inserted through the opening 43 in coupling nut 42 to engage opening 45 in locknut 44. Coupling nut 42 and locknut 44 are then turned together to thread locknut 44 onto a threaded portion 50 of the horizontal gear 10H. This results in the locking engagement shown in FIGS. 2 and 3 with the exception that stub shaft 32 is not present, thus coupling nut 42 will be loosely attached to horizontal gear means 10H, but captured thereto by locknuts 44 and 46.

Figure 2:
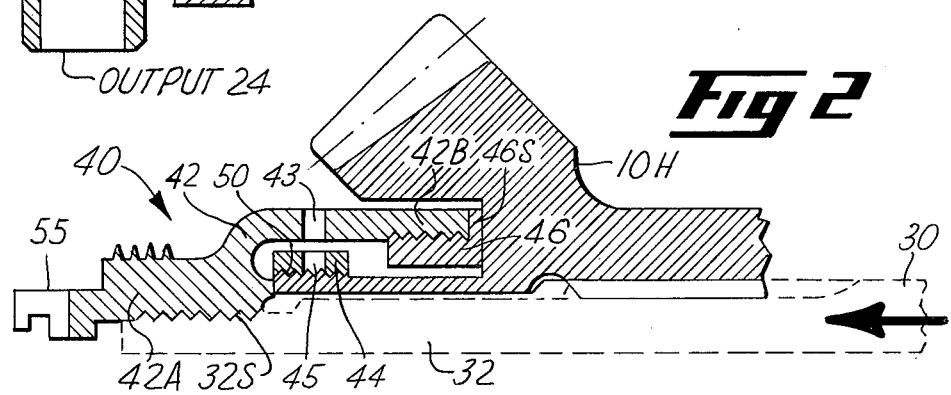
FIGS. 2 and 3 are sectional views, taken as in FIG. 1, showing the removable coupling means of FIG. 1 in greater detail.
Figure 3:
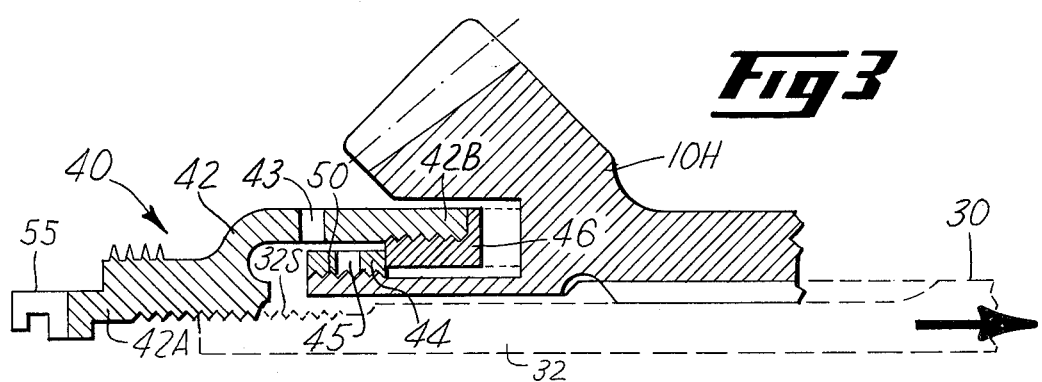

The operation of the form of removable coupling means 40 of FIG. 1–3 will now be further described.

The turning of the coupling nut 42 clockwise (facing the compressor section 30) causes the compressor 30 to be brought (pulled) into (see arrow) the assembled position, FIG. 2 with the fan section 14 (which includes the inlet gearbox module 10). Conversely, turning the coupling nut 42 in a counterclockwise direction causes the compressor section 30 to be pushed away (see arrow) from the inlet gearbox 10, and hence, pulled away from the fan section 14, as shown in FIG. 3. Thus, the coupling means 40 permits the inlet gearbox 10 to be inserted onto the compressor stub shaft 32 or removed from it. Insertion or removal of the gearbox 10 can be simply and conveniently accomplished from the rear end of the compressor section 30 (not shown) by inserting an appropriate tool up and through the compressor shaft. Such a tool need only engage the coupling nut 42 of the coupling means 40. In this connection, it is preferable to provide the coupling means 40 with face slots 55 which can be conveniently engaged by such a rotating tool (not shown).

In the inlet gearbox of the present invention, the gearbox housing is employed to mount the main engine thrust bearing outer race and a length continuation of the horizontal drive gear is used to mount the main engine core thrust bearing inner race. An advantage of the gearbox of the present invention is that the need for separate support gearbox bearings for the horizontal drive gear is eliminated. In addition, difficult drive connections between the horizontal gear and the compressor stub shaft are eliminated. As noted previously, with the inlet gearbox of the present invention, the fixed drive spline is not subject to misalignment wear such as that found in the type of gearbox having its own horizontal gearbox bearing. The entire gearbox module 10 of the present invention can be assembled in a gear room where close control of assembly procedures can be maintained. This is to be contrasted with that form of assembly which generally takes place in an engine assembly area. As a result, assembly of the gearbox module in a carefully controlled environment saves valuable engine assembly time and helps ensure proper assembly. Further, use of the inlet gearbox of the present invention allows the assembly and disassembly of the compressor section without the disassembly of the individual parts of the fan section. The inlet gearbox can be assembled and disassembled from either the forward end of the engine or the rear end of the engine.

While the present invention has been described with reference to specific embodiments thereof, it will be obvious to those skilled in the art that various changes and modifications may be made without departing from the invention in its broader aspects. It is contemplated in the appended claims to cover all variations and modifications of the invention which come within the true spirit and scope of our invention.

We claim:

1. A modular inlet gearbox for use in a gas turbine engine having a fan section with an associated fan frame and a compressor section with the inlet gearbox disposed between the fan section and the forward end of the compressor section, wherein said modular inlet gearbox comprises the following elements removable simultaneously from the gas turbine engine as a unit:
   (a) a gearbox housing removably coupled to a portion of the fan frame;
   (b) gearbox horizontal gear means supported by said gearbox housing, said gearbox horizontal gear means having internal splines for removably mating with an externally splined stub shaft which shaft is situated at the forward end of the compressor section;
   (c) gearbox vertical gear means also supported by said gearbox housing and coupled to said gearbox horizontal gear means for developing a drive output of said inlet gearbox;

(d) main shaft bearing means including an outer race fixedly disposed in said housing and an inner race mounted around and removably attached to a rearward extension of said gearbox horizontal gear means, said main shaft bearing means providing the sole rotational bearing support for said inlet gearbox horizontal gear means and the forward stub shaft end of the compressor section; and (e) multiple locknut means for removably mating said gearbox horizontal gear means to the forward most end of said stub shaft.

2. A modular inlet gearbox in accordance with claim 1 in which said multiple locknut means comprises:

(a) a coupling nut including a first forward internally threaded portion for engaging external threads situated at the forward most portion of said stub shaft, a second rearward internally threaded portion with said second threaded portion being reversely related to said first threaded portion, at least two radial openings through said rearward portion and a radially aligned bearing surface situated in-between said first and second portions to abut with said gearbox horizontal gear means;

(b) an intermediate internally threaded locknut loosely inserted within said coupling nut intermediate said forward and rearward threaded portions for engaging an externally threaded portion of said horizontal gear means and having at least two radial openings therethrough alignable with said radial openings through said coupling nut; and (c) a rear locknut including an externally threaded portion for threadingly engaging said second rearward internally threaded portion of said coupling nut and further including a shoulder portion for abutting with the rearward most portion of said second portion.

3. A modular inlet gearbox in accordance with claim 2 in which said coupling nut includes a plurality of face slots therein for engaging a rotatable instrument.

4. A modular inlet gearbox in accordance with claim 3 in which rotation of said coupling nut in a first direction causes the forward end of the compressor section to be brought into operational position with the fan section and rotation of said coupling nut in the reverse direction allows the forward end of the compressor section to be removed from the fan section.

5. Coupling means, comprising:

(a) a coupling nut including a first forward internally threaded portion, a second rearward internally threaded portion with the threads of said second portion being reversely related to the threads of said first portion, at least two radial openings through said rearward portion, and a radially aligned bearing surface situated in-between said first and second portions;

(b) an intermediate internally threaded locknut loosely insertable within said coupling nut intermediate said forward and rearward threaded portions, said first locknut having at least two radial openings therethrough alignable with said radial openings through said coupling nut; and (c) a rear locknut including an externally threaded portion for threadingly engaging said second rearward internally threaded portion and further including a shoulder portion of said second portion.

6. Coupling means in accordance with claim 5 in which the forward most portion of said first portion further includes a plurality of circumferentially disposed face slots therein.

* * * * *

Disclaimer 4,456,425.—*William V. McCarty*, and *Donald J. Thiemann*, Cincinnati, Ohio. MODULAR INLET GEARBOX FOR A GAS TURBINE ENGINE. Patent dated June 26, 1984. Disclaimer filed Feb. 28, 1986, by the assignee, *General Electric Co.*

Hereby enters this disclaimer to claims 1 through 6 inclusive of said patent.
[*Official Gazette May 13, 1986.*]